Aug. 4, 1931.  S. T. QUILLIAM  1,817,206
SWITCHING DEVICE
Filed Jan. 14, 1928
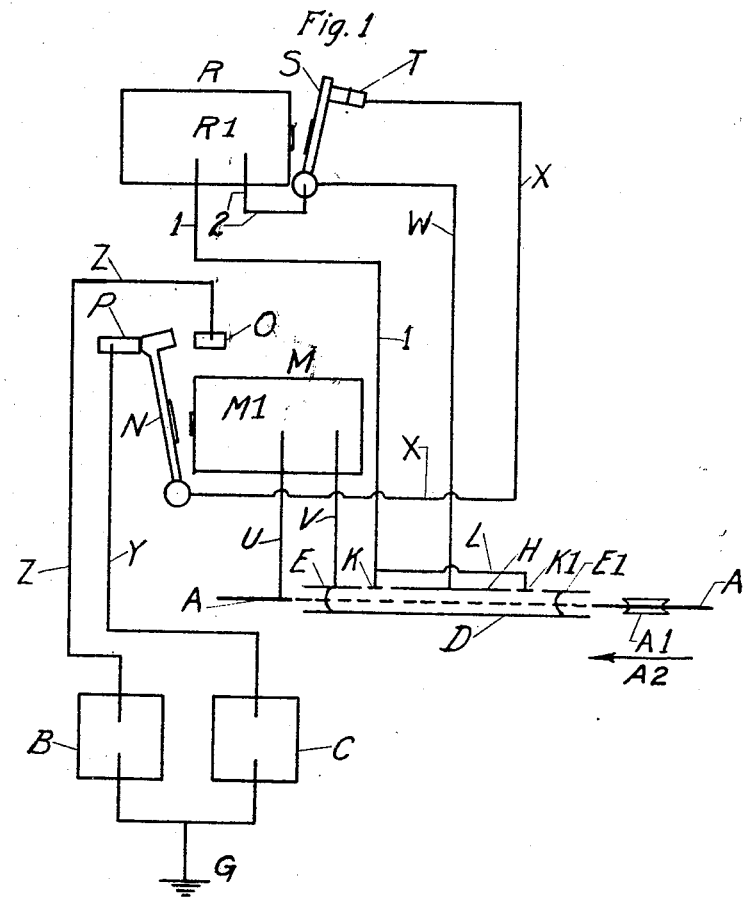
Fig. 1
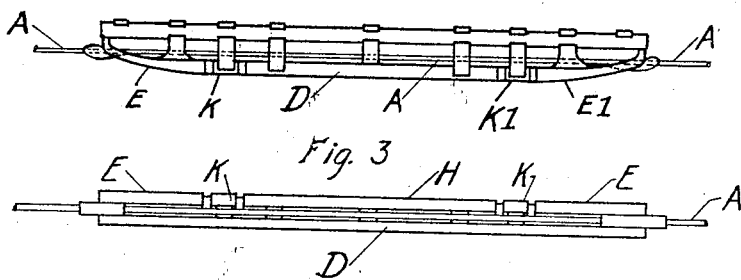
Fig. 2
Fig. 3
INVENTOR.
SAMUEL THOMAS QUILLIAM
BY John L. Milton
ATTORNEY Patented Aug. 4, 1931

1,817,206

UNITED STATES PATENT OFFICE

SAMUEL THOMAS QUILLIAM, OF MANCHESTER, ENGLAND

SWITCHING DEVICE

Application filed January 14, 1928, Serial No. 246,805, and in Great Britain May 17, 1927.

This invention relates to electrical systems for selectively operating an electrical device depending upon predetermined conditions, as for example, the automatic setting of the switch points of electric railways in different positions in accordance with the approach of a car with "power on" or "power off" respectively.

One object of my invention is to produce a simple system to selectively operate the track switch.

Another object of my invention is to control the current flowing to the switch operating mechanism at a desirable point dependent upon the position of a traveling current collector of an electric car with respect to a trolley contacting device.

Further objects and advantages of the invention will become apparent as the disclosure proceeds and the description is read in connection with the accompanying drawings illustrated a selected embodiment and a selected application of the invention, and in which—

Figure 1 is a diagrammatic view showing the arrangement and adaption of parts, according to a preferred example of my invention, to a trolley contactor or pan of a well known type in the electric railway industry.

Fig. 2 is a side elevation of the trolley contactor mounted adjacent the trolley wire.

Fig. 3 is a view of the underneath side showing the general disposition of the contacting elements.

The system shown in Fig. 1 includes switch operating solenoids B and C for operating the switch point in the direction desired, a selecting relay M to select one solenoid or other, dependent upon whether a heavy current or a light current excites its operating coil, a current controlling relay R to positively open the switch operating circuit as the current collector is about to disengage the trolley contactor, and a trolley contactor having its contacting surfaces so arranged as to co-ordinate with the system about to be described. This organization is primarily intended for use with cars employing a current collector such as a trolley wheel A1, carried by a trolley pole of an electric car to supply it with propulsion current and the necessary auxiliary currents to operate the heaters, lights, air compressors et cetera.

The track switch operating mechanism includes two solenoids B and C, each of which is connected at one side to the ground. The opposite sides of these coils are connected by wires Y and Z with the respective contacts P and O of a switch, the operating element of which is the armature N of the selective relay M.

The armature of this relay is connected through the conductor X with contact T which is a back contact of the current controlling relay R. The contact X is normally engaged by the armature S of relay R.

The armature S of relay R is connected by two wires 2 and W. Wire W connects the armature S with the central contacting strip H of the trolley contactor, while wire 2 connects armature S with one coil terminal of the operating coil R1 of relay R. The other coil terminal of operating coil R1 is connected through wire 1 to a short contacting strip K adjacent one end of the central strip H of the trolley contactor. It is desirable that the operation of the device be symmetrical for a current collector passing through the contactor in either direction. For this purpose an additional short strip K1 is provided, and is placed adjacent the opposite end of the central contacting strip H, and is connected with the other short strip K through wire L.

The contactor is also provided with one long contacting strip D, which is placed opposite the contacting strips K, H, and K1, and adjacent the trolley wire A. At each end of the contactor approach deflecting strips E and E1 are disposed, and which are electrically connected at all times to the opposite long strip D.

By referring to Figs. 2 and 3 the general constructional disposition of these elements are more clearly shown. Attention is called to Fig. 2 wherein the method employed for bringing the traveling current collector A1 out of electrical contact engagement with the trolley conductor A is shown. In the construction of this contactor it is not necessary to bend the trolley conductor out of its normal course, and instead the strips are so arranged that a current collector engaging them will not engage the trolley conductor A by reason of the shape of the deflecting strips E, E1, and the extremities of the long contacting strip D. A current collector A1 entering the contactor at either end will leave its general course of travel, and come into electrical engagement with the various contacting strips of the contactor.

Referring again to Fig. 1 it will be seen that the operating coil M1 of relay M is electrically interposed at all times between the trolley conductor A, and the electrically connected strips E, D and E1. This is accomplished thru wire U, connecting one coil terminal of the operating coil M1 to the trolley conductor A, and wire V connecting the other coil terminal of the operating coil M1 to the electrically connected strips E, D and E1.

The ohmic resistance of the operating coils M1 and R1 is comparatively low. For instance, the operating coil R1 is arranged to pickup on a saturating flow of current through either one of the operating solenoids B or C, and in all cases the ampere turns of the operating coil M1 are such that when a current collector bridges the gap between the elements K1 and D, H and D, or K and D of the trolley contactor with "power off," the current will be insufficient to pick up the armature N, but with "power on" it will pick up the armature N.

A car approaching the track switch in the direction of the arrow A2, with the car controller in the "Power off" position, will bring its current collector A1 into contact engagement with the approach deflecting strip E1, and the current collector will be brought out of contact engagement with the trolley conductor A. When the current collector continues and comes into contact engagement with the contacting strip K1, a circuit will be established thru the operating coil M1 of relay M, coil R1 of relay R and the "Power off" switch operating solenoid C. This circuit is completed from the trolley conductor A, thru wire U, operating coil M1 of relay M, wire V, deflecting strip E, contacting strip D, thru the current collector A1, contacting strip K1, wire L, wire 1, operating coil R1 of relay R, wire 2, armature S of relay R1, back contact T of relay R, wire X, armature N of relay M, back contact P of relay M, wire Y to the "Power off" switch operating solenoid C, thence to the ground G. As heretofore mentioned the current through the operating coil M1 of relay M must be comparatively large before its armature is affected. This amount is that generally composed of the combined auxiliary and motor currents of an electric car, and since an amount less than that quantity flowed in the circuit just described, no operation of relay M resulted. However, the current through the operating coil R1 of relay R as heretofore mentioned was sufficient to affect its armature S, and an operation of relay R resulted. This operation of relay R did not materially contribute to the operation of the complete device at this time, since the operation of relay R opens the track switch operating circuit, as will be hereinafter more completely described. As the current collector A1 continues it comes into contact engagement with contacting strips H and D, a circuit was established for the complete operation of the track switch mechanism. The circuit for this operation was completed from the trolley conductor A, thru wire U, operating coil M1 of relay M, wire V, deflecting strip E, contacting strip D, thru the current collector A1, contacting strip H, wire W, armature S of relay R, back contact T of relay R, wire X, armature N of relay M, back contact P of relay M, wire Y to the "Power off" switch operating solenoid C, thence to the ground G, and a complete operation of the track switch mechanism resulted. The current in this circuit continued as long as the current collector A1 engaged the contactor as mentioned. As the current collector continued its course of travel through the trolley contactor it came into engagement with the contacting strips K and D. At this point the current was continued to the switch operating solenoid C, with the operating coil R1 of relay R interposed in the circuit, and hence an operation of the relay R resulted as heretofore mentioned when the current collector engaged the contacting strip K1. When the relay R operated, its armature S was brought out of contact engagement with its back contact T. This operation resulted in the opening of the current flowing in the circuit to the track switch solenoids. The current flowing through the operating coil R1 of relay R was also opened at this time, but as a small time interval is required before the armature S can re-engage its back contact T, the traveling current collector in normal service operation would have advanced until it was out of contact engagement with the contacting strip K, and a re-establishment of the circuit could not occur. If it is found that the circuit is re-established before the current collector disengages the contacting strip K, the operating coil R1 of relay R is arranged in a multiple circuit with wire 1 rather than in series. As the current collector further advanced and left the contactor and returned into contact engagement with the trolley conductor A, no arc of any amplitude as a result of the switch operating mechanism is apparent at the contactor as all switch operating and controlling circuits were opened by the operation of relay R as heretofore described.

It will be noted that the current collector A1, during its course of travel thru the trolley contactor, established circuits in a definite sequence that resulted in the switch operating circuit being first opened then reclosed and consequently re-opened, wherein the control was restored to its normal condition upon disengagement of the current collector and trolley contactor.

When the current collector initially engages the trolley contactor with "Power on", the circuits will perform as described for the "Power off", with the exception that a current of sufficient magnitude would flow through the operating coil M1 of relay M and the motors of the car, to affect an operation of relay M. This operation will cause the armature N of relay M to be brought out of contact engagement with its normally engaged back contact P and into contact engagement with its front contact O. The establishment of this circuit will direct the switch operating current from the trolley contactor through wire 2 to the "Power on" switch operating solenoid, and thence to the ground G.

It will be evident to those skilled in the art, that various modifications may be made in the parts, hereinafter described, but which will still fall within the scope of my invention.

Having thus fully described my invention, what I claim as new and desire to secure by Letters Patent, is:—

1. In a switch operating mechanism, the combination of a line contactor comprising a series of insulated plates, a double solenoid for throwing the switch, an electromagnet adapted to control a circuit leading to one or the other of said solenoids, said electromagnet being connected to a plurality of independent insulated plates on said contactor.

2. In a switch operating mechanism, the combination of a line contactor comprising a series of insulated plates connected to circuits, a double solenoid for throwing the switch, an electromagnet adapted to control a circuit leading to one or the other of said solenoids for a predetermined time, said electromagnet being connected to an independent insulated plate of one of said series of insulated plates on said contactor.

3. In a switch operating mechanism, the combination of a trolley wire, a trolley wheel, a trolley contactor with insulated sections, a circuit including a double solenoid for throwing the switch, an electromagnet adapted to control the circuit leading to one or the other of said solenoids and another circuit connecting a plurality of insulated sections to said solenoid.

4. In a system of the class described, the combination of a normally open circuit including a trolley, a track solenoid, a relay included in the said circuit for selectively directing currents through different parts of the said solenoid, a second relay, a second circuit including the coil and armature of the said second relay and a part of the said track solenoid, and means for successively closing the said first and second circuits.

5. In a system of the class described, the combination of a normally open circuit including a trolley, a track solenoid, a relay included in the said circuit for selectively directing currents through different parts of the said solenoid, a second relay, a second circuit including the coil and armature of the said second relay and a part of the said solenoid, and means for successively closing the first and second circuits in a predetermined sequence.

6. In a system of the class described, the combination of a normally open circuit including a power line, the operating coil of a relay, the operating coil of a second relay, the armatures of the two relays and a track solenoid, a second normally open circuit including the power line, the operating coil of the first relay, two contact elements of a trolley contactor, the armatures of the first and second relays and the track solenoid, the first said circuit also including one of the latter mentioned elements and a third insulated element.

7. In a switch point operating system, the combination of a switch point, a trolley wire, a contact pan having a plurality of contacts to be engaged and bridged by a current collector, electrically operated means to move the switch point to either of two positions at will, a selector switch for directing the current through the above electrically operated means, electrically operated means connected to the trolley and one of said contacts for operating the selector switch, a circuit from another one of said contacts to the switch point operating means including therein the selector switch, and another circuit connecting another one or more of said contacts to the switch operating means, including therein the said selector switch and a second switch operating for a predetermined time to open the said circuit when the contacts are engaged.

8. A switch operating system comprising, in combination, a trolley conductor, an electrically operated track switch, a branch circuit to the track switch, a circuit controlling means operated automatically from a car to control the said circuit for transmitting current from the conductor to the track switch to operate it in the desired direction, and electrically operated means operated automatically to first open the feed of the branch circuits, then close and subsequently reopen.

9. A switch operating mechanism comprising a trolley conductor, a trolley contactor comprising a plurality of contact members to be engaged by a current collector, one of said contact members being electrically connected to the trolley conductor, an electrically operated track switch, a branched circuit leading from another one of said contact members to the track switch, means electrically actuated for opening the branch circuit for a predetermined time when still another one of said contact members is engaged and the current collector is about to disengage the said trolley contactor.

10. In combination with an electrically operated track switch, a trolley conductor, a trolley contactor comprising a plurality of contact members to be engaged by a current collector, one of said contact members being electrically connected to the trolley conductor at all times, a branched circuit leading from another one of said contact members to the said track switch for directing the flow of operating current when the latter mentioned contact member is engaged, means operable by a successive engagement of the current collector with another contact member to open the said circuit for a predetermined time.

11. In combination with an electrical switch operating device, a trolley conductor, a trolley contactor comprising a plurality of contact members to be engaged by a current collector, one of said contact members being electrically connected to the trolley conductor at all times, a branched circuit leading from another one of said contact members to the track switch operating device, and electrically actuated means operable upon engagement of the said current collector with another contact member to open the said circuit for a predetermined time.

12. In a system of the class described, the combination of an electric switch mechanism, electric circuits and control relays therefor, a trolley contactor comprising a plurality of contact elements, a traveling current collector, means whereby a current collector engaging the said contact elements will close a circuit for operating the said switch mechanism, and later close another circuit for continuing the flow of switch operating current and the operation of a relay which will affect an opening of the operating circuit for the said switch operating mechanism.

In testimony whereof I affix my signature.

SAMUEL THOMAS QUILLIAM.